(12) United States Patent
Ko (10) Patent No.: US 7,687,433 B2
(45) Date of Patent: Mar. 30, 2010

(54) METHOD OF FABRICATING PRODUCT OF ACTIVATED CARBON SUPPORTING SILVER

(75) Inventor: Tse-Hao Ko, Taipei (TW)

(73) Assignee: Feng Chia University, Taichung (TW)

( * ) Notice: Subject to any disclaimer, the term of this patent is extended or adjusted under 35 U.S.C. 154(b) by 950 days.

(21) Appl. No.: 10/866,655

(22) Filed: Jun. 15, 2004

(65) Prior Publication Data

US 2004/0259728 A1    Dec. 23, 2004

(30) Foreign Application Priority Data

Jun. 20, 2003    (TW) .............................. 92116910 A (51) Int. Cl.
  *C01B 31/08*    (2006.01)
(52) U.S. Cl. ...................... 502/418; 502/423; 423/447.1
(58) Field of Classification Search .............. 423/447.1, 423/447.5, 460; 502/416, 423, 418; 427/294, 427/296
  See application file for complete search history.

(56) References Cited

U.S. PATENT DOCUMENTS 3,374,608 A * 3/1968 Manes .......................... 95/134
4,576,929 A * 3/1986 Shimazaki .................. 502/417

FOREIGN PATENT DOCUMENTS

| CN | 1103054 | 5/1995 |
| JP | 57-19083 | 2/1982 |
| JP | 10-99678 | 4/1998 |

OTHER PUBLICATIONS

Le Pape, et al, Involvement of reactive oxygen species in the bactericidal activity of activated carbon fibre supporting silver Bactericidal activity of ACF(Ag) mediated by ROS, J. Inorg. Biochem. 2004; 98: 1054-1060.*
Li, et al., Antibacterial Pitch-based Actived Carbon Fiber Supporting Silver, Carbon 1998; 36(1-2): 61-65.*
Oya, et al., Formation of Mesopores in Phenolic Resin-derived Carbon Fiber by Catalytic Activation Using Cobalt, Carbon 1995; 33(8): 1085-1090.*
Oya, et al., Preparation and Properties of an Antibacterial Activated Carbon Fiber Containing Mesopores, Carbon 1996; 34(1): 53-57.*
Wang, et al., Preparation and Characterization of Antibacterial Viscose-based Activated Carbon Fiber Supporting Silver, Carbon 1998; 36(11): 1567-1571.*

(Continued)

*Primary Examiner*—Stanley S. Silverman
*Assistant Examiner*—Daniel C. McCracken
(74) *Attorney, Agent, or Firm*—Rosenberg, Klein & Lee (57) ABSTRACT

A method of fabricating a product of activated carbon fiber supporting silver has the steps of: a) Impregnate activated carbon fibers in a silver acetate solution under a vacuum condition for a predetermined time to deposit silver on surfaces of the activated carbon fibers via a chemical reaction. And then, dry the activated carbon fibers to remove water therein. b) Heat the activated carbon fibers in a stove filled with protective gas to break the silver on the activated carbon fibers into very fine grains, and c) wash the activated carbon fibers to remove redundant sliver from the surfaces of the activated carbon fibers.

9 Claims, 3 Drawing Sheets

OTHER PUBLICATIONS

Ryu, et al., Physical Properties of Silver-containing Pitch-based Activated Carbon Fibers, Carbon 1999; 37: 1619-1625.*
Li, et al., Antibacterial Pitch-based Actived Carbon Fiber Supporting Silver, Carbon 1998; 36(1-2): 61-65.*
Wang, et al., Preparation and Characterization of Antibacterial Viscose-based Activated Carbon Fiber Supporting Silver, Carbon 1998; 36: 1567-1571.*
Oya, A., et al.; "Preparation of pitch-based antibacterial activated carbon fiber"; Carbon vol. 31, pp. 1243-1247; Elsevier Science Ltd.; 1993.
Li, C.; et al.; "Antibacterial pitch-based activated carbon fiber supporting silver"; Carbon vol. 36, pp. 61-65; Elsevier Science Ltd.; 1998.

* cited by examiner

METHOD OF FABRICATING PRODUCT OF ACTIVATED CARBON SUPPORTING SILVER

BACKGROUND OF THE INVENTION

1. Field of the Invention

The present invention relates generally to a method of fabricating the product of activated carbon fiber supporting silver, which the activated carbon fibers are impregnated in a silver compound solution to deposit the silver on the surfaces of the activated carbon fibers and the product thereof has a superior antibacterial property.

2. Description of the Related Art

Figure 2:
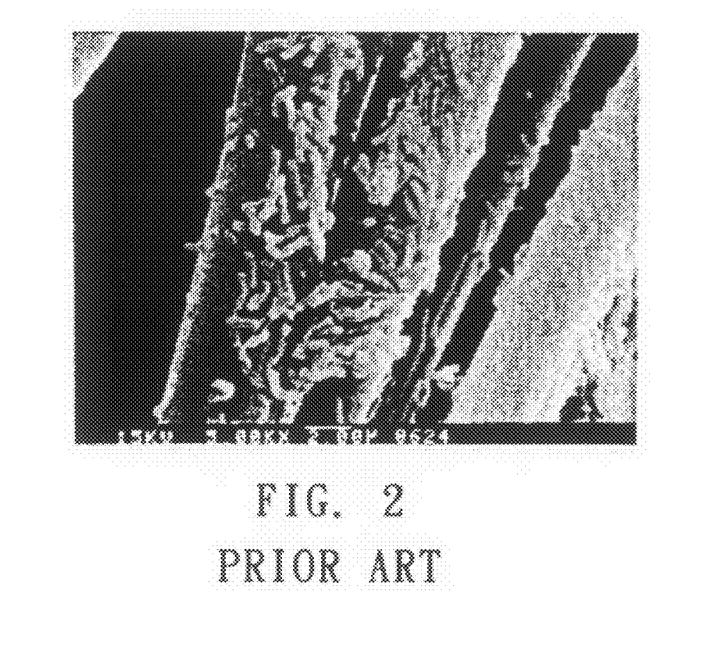
FIG. 2 shows a SEM picture of the conventional activated carbon fibers, in which *E. coli* are adsorbed on the fibers in a multi-layer condition.

In the present industry, industrial wastewater and home wastewater are increased. Activated carbon has been broadly applied to the treatment of wastewater and drink water for a long time. The carbon material has a well property of bioaffinity to adsorb bacteria and microorganisms. But the activated carbon becomes another pollutant today, as shown in FIG. 2.

Activated carbon fibers are a new adsorbent with a superior performance. The activated carbon fibers, the granulated activated carbon and the powdered activated carbon are the carbon materials with a great amount of pores. They are superior in adsorbent property, antibiotic resistance, hydrophobic property, electron supply and specific surface area and so on. The main differences between the activated carbon fiber and the granulated activated carbon are molecule structure, appearance and surface pores' structure. To compare with the conventional activated carbon, the activated carbon fiber has a less diffusive resistance in adsorption and in separation and can be fabricated into various forms, such as felt or cloth, in second process. The activated carbon fiber has a greater specific surface area and adsorption efficiency than the granulated activated carbon.

To form silver on the activated carbon fibers for the antibacterial property, one had provided silver acetate solution mixed with pitch, and then taking the spinning process and stabilization, and then taking activation under 900° C. via vapor. It gets activated carbon fibers with silver of 0.03% by weight. In aforesaid method, it still has to improve the spinning process and activation to fabricate the activated carbon fibers supporting silver with a greater specific surface area.

Another one had provided the pitch base activated carbon fibers impregnated in a monounsaturated silver acetate solution for twelve hours, and then takes the high temperature degration process in nitrogen gas under 420° C. for 30 minutes to get the pitch base activated carbon fibers supporting silver. This method still has drawbacks of how to average the silver distribution and how to precipitate silver from water.

The present inventor creates a method to overcome aforesaid drawbacks and to fabricate activated carbon with antibacterial property. In the result of washing test, the silver leachability is less than 50 ppb. It conforms to US drink water standard.

SUMMARY OF THE INVENTION

The primary objective of the present invention is to provide a method of fabricating a product of activated carbon fibers supporting silver, in which the activated carbon fibers are impregnated in a silver acetate solution for a predetermined time and in a vacuum condition to deposit silver on surfaces of the activated carbon fibers via a chemical reaction. The activated carbon fibers with silver is processed with high temperature degration to change the property of the silver that the sliver is broken into very fine grains and attached on the surfaces of the activated carbon fiber. Redundant silver of the activated carbon fibers, and then, is removed via a washing process to form the activated carbon fibers supporting silver of the present invention. The activated carbon fibers adsorb bacteria and the silver kills them to provide the activated carbon fibers with a superior performance of antibacterial property.

According to the objectives of the present invention, a method of fabricating a product of activated carbon supporting silver comprises the steps of:

a) Impregnate Activated Carbon Fibers in a Silver Acetate Solution:

The activated carbon fibers are impregnated in the silver acetate solution in a vacuum condition for 1 minute to 720 minutes. Silver is deposited on surfaces of the activated carbon fibers via a chemical reaction. And then, dry the activated carbon fibers to remove water.

b) High Temperature Degration Process:

Heat the activated carbon fibers with silver to a predetermined temperature in a range between 120° C. and 450° C. for 5 minutes to 120 minutes. The silver on the surfaces of the activated carbon fibers is broken into very fine grains.

c) Washing Process:

Wash the activated carbon fibers with silver for 1 minute to 600 hours to remove redundant sliver from the surfaces of the activated carbon fibers. And then, dry the activated carbon fibers with silver to complete the product of the activated carbon fibers supporting silver.

The product of the activated carbon fibers supporting silver, which the silver content is greater than 0.001 wt % and the BET specific surface area thereof is greater than 600 $m^2/g$. The carbon content is greater than 60% by weight and the density thereof is greater than 1.8 $g/m^3$. The silver leachability of the present invention is less than 50 ppb after washing. It conforms to the US drink water standard. For the antibacterial property test, which applies membrane filter procedure (Taiwan official standard test NIEA E202.51B of Environmental Protection Administration), for *E. coli* and *pseudomonas aeruginosa*. The filtering property of the activated carbon fibers supporting silver cloth of the present invention is greater than 80% and the antibacterial property thereof is 100%.

DETAILED DESCRIPTION OF THE INVENTION

Figure 1:
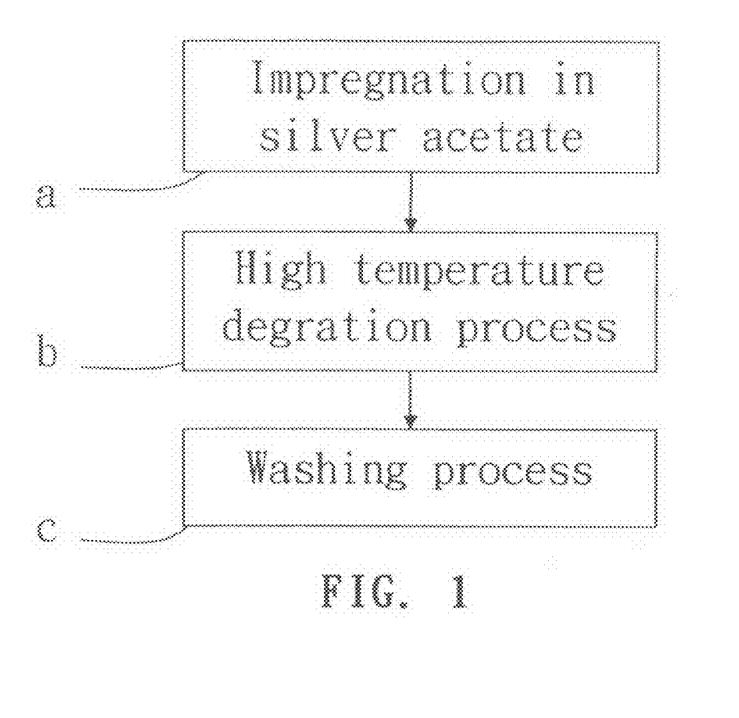
FIG. 1 is a flow chart of the method of the present invention.

As shown in FIG. 1, a method of fabricating a product of activated carbon supporting silver comprises the steps of:

a) Impregnate Activated Carbon Fibers in a Silver Acetate Solution:

The activated carbon fibers are impregnated in the silver acetate solution with various concentrations under a vacuum condition for 1 minute to 720 minutes. The pH value is between 3 and 8. Silver is deposited on surfaces of the activated carbon fibers via a chemical reaction. And then, dry the activated carbon fibers to remove water.

b) High Temperature Degration Process:

Put the activated carbon fibers with silver in a stove filled with a protective gas to heat them to a predetermined temperature between 120° C. and 450° C. for 5 minutes to 120 minutes. The silver on the surfaces of the activated carbon fibers is broken into very fine grains.

c) Washing Process:

Wash the activated carbon fibers supporting silver after high temperature degration for 1 minute to 600 hours to remove redundant sliver from the surfaces of the activated carbon fibers. And then, dry the activated carbon fibers with silver to complete the product of the activated carbon fibers supporting silver.

The antibacterial property test takes $E.\ coli$ CCRC 14895 and pseudomonas aeruginosa 11846 to be the tested bacteria. The product of activated carbon fibers supporting silver of the present invention is tested for its filtering property and antibacterial property. The test of $E.\ coli$ applies the membrane filter procedure (standard test of NIEA E202.51B) and the test of $pseudomonas\ aeruginosa$ applies standard test of NIEA E204.51B. The test unit is Chi-Mei Entech Co. Ltd (Taiwan registered test unit No. 025).

1) Filtering Property:

Take pre-filtered solutions (PFS) of $E.\ coli$ and $pseudomonas\ aeruginosa$ with various concentrations and filter them by the conventional activated carbon fibers cloth and a cloth of the activated carbon fibers supporting silver of the present invention. The solution after filtered is called filtered solution (FS). The filtering property is calculated by the difference of the numbers of bacteria in the pre-filtered solution and in the filtered solution.

$$\text{Filtering property} = \frac{(\text{bacteria numbers in } PFS) - (\text{bacteria numbers in } FS)}{(\text{bacteria numbers in } PFS)} \times 100\%$$

2) Antibacterial Property:

The antibacterial property is calculated from the difference of bacteria in the pre-filtered solution (PFS) and in the washed solution (WS), which the filtered solutions of activated carbon fibers and activated carbon fibers supporting silver are sealed, impregnated and washed in 100 ml sterile water for 24 hours.

$$\text{Filtering property} = \frac{(\text{bacteria numbers in } PFS) - (\text{bacteria numbers in } WS)}{(\text{bacteria numbers in } PFS)} \times 100\%$$

Except for the tests above, we further take some extra tests and analysis and they are described hereunder:

1) Carbon Elemental Analysis:

Equipment: F002-Heraeus CNS-O-Rapid Element Analyzer

Method: Take 3 mg to 4 mg sample and send it to a combustion chamber filled with 950° C. pure oxygen via a carrier gas, such as helium, to be heated for 2 minutes. The sample is decomposed into $CO_2$, $H_2O$, $N_2$ and $NO_x$. And then, $NO_x$ is reduced to $N_2$ by pure copper and is separated by GC-column. The gas is sensed by a sensor and is analyzed by computer to calculate the quantities of carbon, hydrogen and oxygen.

2) Density Test:

Equipment: Accupyc 1330 Pynometer Density Meter

Method: Put the dried sample into the container of the density meter and measure the weight thereof. Inflect high pressure helium into the concentration meter and wait for equilibrium. The average density of the sample is calculated by idea gas equation (PV=nRT).

3) Silver Content Test (Apply Atomic Absorption Sectrophotometry, AA):

Equipment: HITACHI Polarized Zeeman Atomic Absorption Sectrophotometry, Z800 system.

Method:
(1) Nitrified and abstraction of silver: Ash 4 g to 5 g ACF-Ag sample in 800° C. air for 6 hours and impregnate the ash in the 50 ml, 10% $HNO_3$ solution.
(2) Prepare the standard solution of silver ions to make a calibration curve.
(3) Sense the silver content by a flame-type of atomic absorption sectrophotometry. The combustion-supporting gas is acetylene gas and the flue is air.

4) Specific surface test (BET):

Equipment: Micromeritics Flowsorb II 2300

Method: The sample is heated to 250° C. and degassed, and then, is filled with adsorption gas (nitrogen gas, the flow rate: 4.6 cm$^3$/min). The temperature is kept at 77K and the pressure is kept at 760 mm-Hg.

We give eight examples and two compared examples hereunder to describe the detail of the present invention:

Example 1

Material: Polyacrylonitrile base activated carbon fiber cloth

Properties:
Weight: 70 g/m$^2$, density of knit: 16 tows per inch
BET specific surface area: 1630 m$^2$/g
Density: 2.09 g/ml
Carbon content: 85 wt %
Sliver content: 0 wt %

Method of Fabrication:

a) Impregnation in Silver Acetate Solution:

The activated carbon fibers, under a vacuum condition, are impregnated in a silver acetate solution with a concentration of 0.1 mol/L and a pH value of 3.8 for five hours to deposit the silver on the surfaces of the activated carbon fibers via chemical reaction. And then, the activated carbon fibers are dried to remove water.

b) High Temperature Degration Process:

Heat the activated carbon fibers in a stove filled with nitrogen under 400° C. for 90 minutes. The silver on the activated carbon fibers is broken into very fine grains.

After the processes, the properties of the activated carbon fibers are listed hereunder:

BET specific surface area: 1220 m$^2$/g
Density: 2.13 g/ml
Carbon content: 64 wt %
Sliver content: 12.5 wt %

The activated carbon fibers is tested by aforesaid tests and its properties are:

For $E.\ coli$, the filtering property is 100% and the antibacterial property is 100%.

For $pseudomonas\ aeruginosa$, the filtering property is 100% and the antibacterial property is 100%.

Example 2

Material: same as the material of Example 1
Method of Fabrication:
a) Impregnation in Silver Acetate Solution:

The activated carbon fibers, under a vacuum condition, are impregnated in a silver acetate solution with a concentration of 0.1 mol/L for five hours to deposit the silver on the surfaces of the activated carbon fibers via chemical reaction. And then, the activated carbon fibers are dried to remove water.

b) High Temperature Degration Process:

Heat the activated carbon fibers in a stove filled with nitrogen under 400° C. for 90 minutes. The silver on the activated carbon fibers is broken into very fine grains.

c) Washing Process:

Wash the activated carbon fibers in a flow of water (flow rate: 4.5 L/min) for 120 hours to remove redundant sliver from the surfaces of the activated carbon fibers. And then, dry the activated carbon fibers with silver to complete the product of the activated carbon fibers supporting silver.

After the processes, the properties of the activated carbon fibers are listed hereunder:
BET specific surface area: 1220 $m^2/g$
Density: 2.13 g/ml
Sliver content: 0.03 wt %

The activated carbon fibers is tested by aforesaid tests and its properties are:
For *E. coli*, the filtering property is 82% and the antibacterial property is 100%.

Example 3

Material: same as the material of Example 1
Method of fabrication: same as the method of Example 2, except that the washing time is prolonged to ten days.

After the processes, the properties of the activated carbon fibers are listed hereunder:
BET specific surface area: 1220 $m^2/g$
Density: 2.13 g/ml
Carbon content: 81 wt %
Sliver content: 0.03 wt %

The activated carbon fibers is tested by aforesaid tests and its properties are:
For *pseudomonas aeruginosa*, the filtering property is 93% and the antibacterial property is 100%.

Example 4

Material: same as the material of Example 1
Method of Fabrication:
a) Impregnation in Silver Acetate Solution:

The activated carbon fibers, under a vacuum condition, are impregnated in a silver acetate solution with a concentration of 0.001 mol/L and a pH value of 6.4 for five hours to deposit the silver on the surfaces of the activated carbon fibers via chemical reaction. And then, the activated carbon fibers are dried to remove water.

b) High Temperature Degration Process:

Heat the activated carbon fibers in a stove filled with nitrogen under 400° C. for 90 minutes. The silver on the activated carbon fibers is broken into very fine grains.

After the processes, the properties of the activated carbon fibers are listed hereunder:
BET specific surface area: 1500 m2/g
Density: 2.05 g/ml
Carbon content: 80 wt %
Sliver content: 0.53 wt %

The activated carbon fibers is tested by aforesaid tests and its properties are:
For *E. coli*, the filtering property is 100% and the antibacterial property is 100%.

For *pseudomonas aeruginosa*, the filtering property is 100% and the antibacterial property is 100%.

Example 5

Material: same as the material of Example 1
Method of Fabrication:
a) Impregnation in Silver Acetate Solution:

The activated carbon fibers are, under a vacuum condition, impregnated in a silver acetate solution with a concentration of 0.001 mol/L and a pH value of 6.4 for five hours to deposit the silver on the surfaces of the activated carbon fibers via chemical reaction. And then, the activated carbon fibers are dried to remove water.

b) High Temperature Degration Process:

Heat the activated carbon fibers in a stove filled with nitrogen under 400° C. for 90 minutes. The silver on the activated carbon fibers is broken into very fine grains.

c) Washing Process:

Wash the activated carbon fibers in a flow of water (flow rate: 4.5 L/min) for one day to remove redundant sliver from the surfaces of the activated carbon fibers. And then, dry the activated carbon fibers with silver to complete the product of the activated carbon fibers supporting silver.

After the processes, the properties of the activated carbon fibers are listed hereunder:
BET specific surface area: 1520 $m^2/g$
Density: 2.05 g/ml
Carbon content: 82 wt %
Sliver content: 0.23 wt %

The activated carbon fibers is tested by aforesaid tests and its properties are:
For *E. coli*, the filtering property is 82% and the antibacterial property is 100%.

Example 6

Material: same as the material of Example 1
Method of fabrication: same as the method of Example 5, except that the washing time is prolonged to ten days.

After the processes, the properties of the activated carbon fibers are listed hereunder:
BET specific surface area: 1520 $m^2/g$
Density: 2.08 g/ml
Carbon content: 83 wt %
Sliver content: 0.075 wt %

The activated carbon fibers is tested by aforesaid tests and its properties are:
For *pseudomonas aeruginosa*, the filtering property is 100% and the antibacterial property is 100%.

Example 7

Material: PAN-based activated carbon fibers felt.
Properties:
Weight: 100 $g/m^2$
BET specific surface area: 600 $m^2/g$
Density: 1.9320 g/ml
Carbon content: 86 wt %
Sliver content: 0 wt %
Method of Fabrication:
a) Impregnation in Silver Acetate Solution:

The activated carbon fibers, under a vacuum condition, are impregnated in a silver acetate solution with a concentration of 0.001 mol/L and a pH value of 6.4 for five hours to deposit the silver on the surfaces of the activated carbon fibers via chemical reaction. And then, the activated carbon fibers are dried to remove water.

b) High Temperature Degration Process:

Heat the activated carbon fibers in a stove filled with nitrogen under 400° C. for 90 minutes. The silver on the activated carbon fibers is broken into very fine grains.

c) Washing Process:

Wash the activated carbon fibers in a flow of water (flow rate: 4.5 L/min) for three days to remove redundant sliver from the surfaces of the activated carbon fibers. And then, dry the activated carbon fibers with silver to complete the product of the activated carbon fibers supporting silver.

After the processes, the properties of the activated carbon fibers are listed hereunder:

Weight: 100 g/m$^2$
BET specific surface area: 580 m$^2$/g
Density: 1.9425 g/ml
Carbon content: 73 wt %
Sliver content: 0.075 wt %

The activated carbon fibers is tested by aforesaid tests and its properties are:

For *E. coli*, the filtering property is 82% and the antibacterial property is 100%.

Test unit: China Textile Institute; method: US antibacterial test procedure AATTCC 100-1998. The properties of the activated carbon fibers of the present example are:

For *staphylococcus aureaus* (ATCC 6538P), the antibacterial property is over 99.98%.

For *Klebisella pneumoniae* (ATCC 4352), the antibacterial property is over 99.98%.

Example 8

Material: phenolic activated carbon fibers felt
Properties:
Weight: 100 g/m$^2$
BET specific surface area: 1420 m$^2$/g
Density: 2.0320 g/ml
Carbon content: 85 wt %
Sliver content: 0 wt %

Method of Fabrication:

a) Impregnation in Silver Acetate Solution:

The activated carbon fibers, under a vacuum condition, are impregnated in a silver acetate solution with a concentration of 0.001 mol/L and a pH value of 6.4 for five hours to deposit the silver on the surfaces of the activated carbon fibers via chemical reaction. And then, the activated carbon fibers are dried to remove water.

b) High Temperature Degration Process:

Heat the activated carbon fibers in a stove filled with nitrogen under 400° C. for 90 minutes. The silver on the activated carbon fibers is broken into very fine grains.

c) Washing Process:

Wash the activated carbon fibers in a flow of water (flow rate: 4.5 L/min) for three days to remove redundant sliver from the surfaces of the activated carbon fibers. And then, dry the activated carbon fibers with silver to complete the product of the activated carbon fibers supporting silver.

After the processes, the properties of the activated carbon fibers are listed hereunder:

Weight: 100 g/m$^2$
BET specific surface area: 1380 m$^2$/g
Density: 2.0425 g/ml
Carbon content: 75 wt %
Sliver content: 0.072 wt %

Test its filtering property and antibacterial property for the *E. coli* by the procedure NIEA E202.51B of Taiwan Environmental Protection Administration, the filtering property is 99.99% and the antibacterial property is 100%.

Compared Example 1

Material: Polyacrylonitrile activated carbon fibers cloth
Properties:
Weight: 70 g/m$^2$, density of knit: 16 tows per inch
BET specific surface area: 1630 m$^2$/g
Density: 2.09 g/ml
Carbon content: 85 wt %
Sliver content: 0 wt %

For *E. coli*, the filtering property is 35% and the antibacterial property is 0%.

For *pseudomonas aeruginosa*, the filtering property is 87% and the antibacterial property is 0%.

For *Klebisella pneumoniae* (ATCC 4352), the antibacterial property is 0%. (Test unit: China Textile Institute; method: US antibacterial test procedure AATTCC 100-1998)

Compared Example 2

Material: Polyacrylonitrile activated carbon fibers cloth
Properties:
Weight: 100 g/m$^2$
BET specific surface area: 600 m$^2$/g
Density: 1.9320 g/ml
Carbon content: 86 wt %
Sliver content: 0 wt %

The antibacterial property for *staphylococcus aureaus* (ATCC 6538P) is over 68.11% and for *Klebisella pneumoniae* (ATCC 4352) is 0%.

Table 1 to Table 4 show the antibacterial properties of various activated carbon fiber products for *E. coli, pseudomonas aeruginosa, staphylococcus aureaus* and *Klebisella pneumoniae*. For the activated carbon fiber supporting silver, the reduction of bacteria has a part thereof, which *E. coli* and *pseudomonas aeruginosa* are adsorbed by the pores of the fibers while filtering and another part thereof, which *E. coli* and *pseudomonas aeruginosa* are killed by the silver ions or very fine grains of silver while filtering. Therefore, the filtering property and antibacterial property of *E. coli, pseudomonas aeruginosa, staphylococcus aureaus* and *Klebisella pneumoniae* is relative to the BET specific surface area of the fibers and the silver content.

TABLE 1 antibacterial property tests for *E. coli* CCRC 14895

| Examples | Pre-filtered solution (CFL/mL) | Filtered solution (CFL/mL) | Washed solution (CFL/mL) |
| --- | --- | --- | --- |
| Example 1 | 4.8 × 10$^6$ | 0 | 0 |
| Example 2 | 7.6 × 10$^5$ | 1.4 × 10$^5$ | 0 |
| Example 4* | 1.9 × 10$^3$ | 0 | 0 |
| Example 5 | 1.6 × 10$^5$ | 2.1 × 10$^4$ | 0 |
| Compared example 1 | 4.8 × 10$^6$ | 3.1 × 10$^6$ | 9.7 × 10$^6$ |

Test unit:
Chi-Mei Entech Co. Ltd (Taiwan registered No. 025),
*means it is tested by Kuen-Ting Entech Co. Ltd (FS 35677)
Note:
In Taiwan official standard of drink water, numbers of *E. coli* in water are less than 600 CFU/mL.

TABLE 2 antibacterial property tests for *pseudomonas aeruginosa* 11846

| Examples | Pre-filtered solution (CFL/mL) | Filtered solution (CFL/mL) | Washed solution (CFL/mL) |
|---|---|---|---|
| Example 1 | $1.2 \times 10^7$ | $1.0 \times 10^2$ | <1 |
| Example 2 | $1.9 \times 10^7$ | $1.4 \times 10^6$ | $2.6 \times 10^2$ |
| Example 4* | $9.2 \times 10^6$ | 61 | 0 |
| Example 5 | $3.1 \times 10^7$ | $1.4 \times 10^4$ | 0 |
| Compared example 1 | $1.2 \times 10^7$ | $1.1 \times 10^7$ | $1.4 \times 10^3$ |

Test unit: Chi-Mei Entech Co. Ltd (Taiwan registered No. 025)

TABLE 3 comparison of antibacterial properties

| | E. coli | | pseudomonas aeruginosa | |
|---|---|---|---|---|
| | Filtering property | antibacterial property | Filtering property | antibacterial property |
| Example 1 | 100% | 100% | 100% | 100% |
| Example 2 | 82% | 100% | — | — |
| Example 3 | — | — | 93% | 100% |
| Example 4 | 100% | 100% | 100% | 100% |
| Example 5 | 100% | 100% | — | — |
| Example 6 | — | — | 100% | 100% |
| Compared example 1 | 35% | 0 | 8% | 100% |

Test procedure:
standard procedures of NIEA E202.51B and NIEA E204.51B of Taiwan Environment Protection Administration.

TABLE 4

Results of antibacterial property tested by China Textile Institute

| | | Result comparison | | |
|---|---|---|---|---|
| Items | | Example 7 | Compared example 2 | procedure |
| *staphylococcus* | Initial bacteria (B) | $1.13 \times 10^5$ | $1.13 \times 10^5$ | AATTCC |
| *aureaus* | Cultured bacteria (A) | <20 | $3.94 \times 10^4$ | 100-1998 |
| (ATCC 6538P) | Reduction ratio (R) | >99.8% | 68.11% | |
| *Klebisella* | Initial bacteria (B) | $1.16 \times 10^5$ | $1.16 \times 10^5$ | AATTCC |
| *pneumoniae* | Cultured bacteria (A) | <20 | $>6.00 \times 10^5$ | 100-1998 |
| (ATCC 4352) | Reduction ratio (R) | >99.8% | <0 | |

Note 1:
1) Initial bacteria (B): the bacteria numbers at initial of mixture of test sample, standard sample and bacteria solution (culture time is 0). If there is no significant difference between two samples, the initial bacteria are the average value. If there is a significant difference, the initial bacteria are the greater value.
2) Cultured bacteria (A): the bacteria numbers in the test sample that is cultured for 18–24 hours at 37° C.
3) Reduction ratio (R) = (B − A)/B × 100%
note 2:
If the value of reduction ratio (R) is between 0 and 100%, that means it has antibacterial effect and if the value of reduction ratio (R) is under 0, that means it has no antibacterial effect.

FIG. 2 to FIG. 5 show the enlarged views of the activated carbon fibers with/without silver under the scanning electron microscopy (SEM). The activated carbon fibers are impregnated in the solutions of *E. coli* and *pseudomonas aeruginosa* for 30 minutes. The fibers are fixed and dehydrated before they are put under the SEM. The pictures are enlarged for 5000 times.

Figure 3:
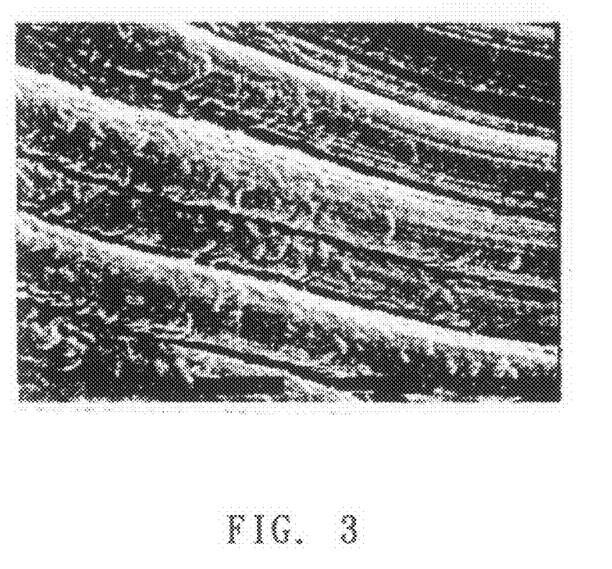
FIG. 3 shows a SEM picture of the conventional activated carbon fibers, in which pseudomonas aeruginosa are adsorbed on the surfaces of the fibers via fine tissues.

FIG. 2 shows *E. coli* and *pseudomonas aeruginosa* adsorbed on the conventional activated carbon fibers in a multi-layer condition. As shown in FIG. 3, these bacteria are adsorbed on the fibers via the fine tissues thereof. The *E. coli* are connected to the *pseudomonas aeruginosa* via the attraction therebetween. There are few documents that discuss how the microorganisms adsorbed on the activated carbon fibers. A hypothesis is that the nutrient medium of the microorganism is related to the adsorption of the activated carbon fiber. The microorganisms need nutrient medium and they are growing well around the activated carbon fibers. That is why there are bacteria accumulated on the activated carbon and activated carbon fiber.

Figure 4:
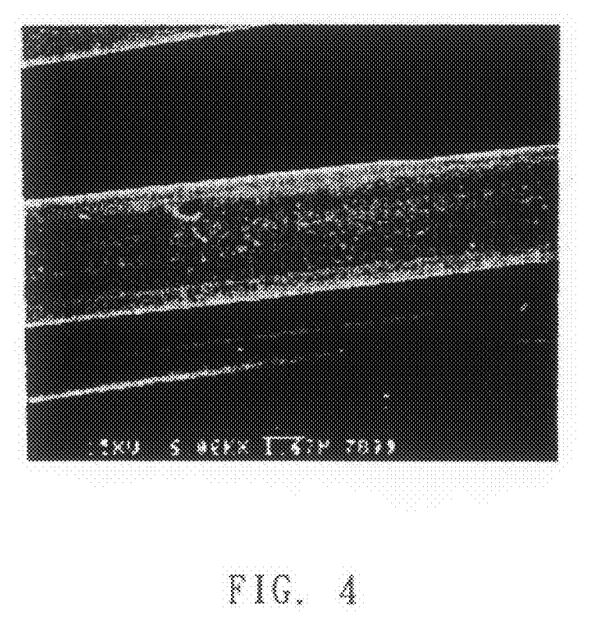
FIG. 4 shows a SEM picture of the product of the example four of the present invention, in which no *E. coli* is found on the fibers.
Figure 5:
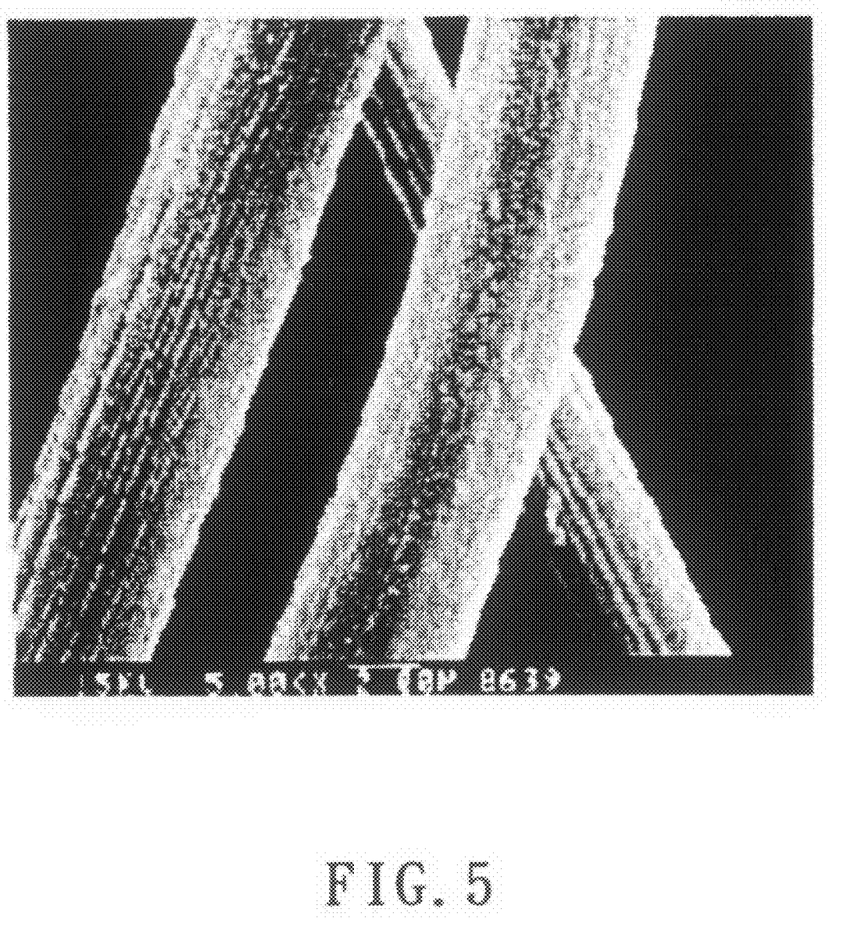
FIG. 5 shows a SEM picture of the product of the example six of the present invention, in which it is hard to find a complete *pseudomonas aeruginosa* on the fibers.

FIG. 4 and FIG. 5 are the pictures of the activated carbon fiber supporting silver of the present invention, in which it is hard to find *E. coli* and *pseudomonas aeruginosa* adsorbed thereon. FIG. 4 is the product of Example 4 and FIG. 5 is the product of Example 6. In FIG. 5, it is hard to find a complete bacterium on the fibers. If do, the bacteria are deformed and some of them are depressed. It should be the silver ions on the fibers destroying the bacteria. The sample is fixed and dehydrated prior to put on the SEM, so that the bacteria are dead at that time and the dead bacteria will flow to the fixing solution and the dehydrating solution (alcohol). As a result, it is hard to find on the fibers. If do, they are depressed or broken bacteria.

According to the tests, it will find the product of activated carbon fiber supporting silver of the present invention having the filtering property and the antibacterial property better than the conventional activated carbon fiber product. The antibacterial property, after sufficient washing, is still kept at 100%. The conventional product has a poor filtering property to *E. coli* and *pseudomonas aeruginosa* and it also has a poor filtering property to *staphylococcus aureaus* and *Klebisella pneumoniae*, as shown in Table 4. All the tests indicate that the filtering property and the antibacterial property the product of activated carbon fiber supporting silver of the present invention are superior to the conventional activated carbon fiber product.

In conclusion, the present invention provides the activated carbon fibers impregnated in the silver acetate solution under the vacuum condition for a predetermined period to deposit silver on the fibers. The activated carbon fibers are processed for high temperature degration to break the silver into very fine grains. And then, the activated carbon fibers are washed to remove the redundant silver. The product of the activated carbon fiber supporting silver can adsorb bacteria via the activated carbon fibers and kill the bacteria via silver to achieve the antibacterial objective of the present invention.

In the specification of the present invention, we only provide a few of preferred embodiments. The scope of the present invention should not be restricted in the preferred embodiment. Any equivalent designation should be still in the scope of the present invention.

What is claimed is:

1. A method of fabricating a product of polyacrylonitrile activated carbon fiber supporting silver, comprising the steps of:
   a) impregnation process:
      impregnating polyacrylonitrile activated carbon fibers with silver wherein said polyacrylonitrile activated carbon fibers are immersed in a silver acetate solution under vacuum conditions for 1 minute to 720 minutes to deposit silver on surfaces of the polyacrylonitrile activated carbon fibers via a chemical reaction;
   b) drying process:
      drying said polyacrylonitrile activated carbon fibers supporting silver to remove water content therefrom;
   c) high temperature degradation process:
      heating the polyacrylonitrile activated carbon fibers free of water content in a stove filled with protective gas under 120° C. to 450° C. for 5 minutes to 120 minutes to break the silver on the polyacrylonitrile activated carbon fibers into very fine grains, and
   d) washing process:
      washing the polyacrylonitrile activated carbon fibers for 1 minute to 600 hours to remove redundant sliver from the surfaces of the polyacrylonitrile activated carbon fibers.

2. The method as defined in claim 1, wherein the silver acetate solution has a concentration in a range between 0.001 mol/L and 10 mol/L.

3. The method as defined in claim 1, wherein the polyacrylonitrile activated carbon fibers are dried under 25° C. to 150° C. in the step b.

4. The method as defined in claim 1, wherein the stove is filled with protective gas to prevent the polyacrylonitrile activated carbon fibers from oxidization and ashing in the step b.

5. The method as defined in claim 1, wherein the stove has a vacuum chamber therein to prevent the polyacrylonitrile activated carbon fibers from oxidization and ashing in the step b.

6. The method as defined in claim 1, wherein the polyacrylonitrile activated carbon fibers has carbon of over 50% by weight and a BET specific surface area greater than 400 $m^2/g$.

7. The method as defined in claim 1, wherein the product is made into a cloth and a felt.

8. The method as defined in claim 1, wherein the time of the impregnation process in the step a is preferred in a range between 1 minute and 12 hours.

9. The method as defined in claim 1, wherein the product of the polyacrylonitrile activated carbon fiber supporting silver has a density greater than 1.8 g/mL.

* * * * *